United States Patent
Brito Lopes et al.

(10) Patent No.: US 8,434,933 B2
(45) Date of Patent: May 7, 2013

(54) NETWORK MIXER AND RELATED MIXING PROCESS

(76) Inventors: José Carlos Brito Lopes, Oporto (PT);
Paulo Eduardo Miranda dos Santos da Costa Laranjeira, Oporto (PT);
Madalena Maria Gomes Queiroz Dias, Oporto (PT); António Augusto Areosa Martins, Oporto (PT)

( * ) Notice: Subject to any disclaimer, the term of this patent is extended or adjusted under 35 U.S.C. 154(b) by 1188 days.

(21) Appl. No.: 10/589,463

(22) PCT Filed: Feb. 14, 2005

(86) PCT No.: PCT/IB2005/000647
§ 371 (c)(1),
(2), (4) Date: Sep. 19, 2008

(87) PCT Pub. No.: WO2005/077508
PCT Pub. Date: Aug. 25, 2005

(65) Prior Publication Data
US 2009/0016154 A1  Jan. 15, 2009

(30) Foreign Application Priority Data
Feb. 13, 2004  (PT) .......................................... 103072

(51) Int. Cl.
*B01F 13/00* (2006.01)
*B01F 5/06* (2006.01)

(52) U.S. Cl.
USPC ........ 366/341; 366/336; 366/165.2; 366/340; 366/177.1; 137/599.12; 137/896; 435/288.3; 435/288.4; 435/288.5

(58) Field of Classification Search .................. 366/336, 366/165.2, 340, 177.1, 341; 137/599.12, 137/896; 435/288.3, 288.4, 288.5
See application file for complete search history.

(56) References Cited

U.S. PATENT DOCUMENTS

| 7,753,580 B2 * | 7/2010 | Woehl et al. ............... 366/178.1 |
| 2004/0145967 A1 * | 7/2004 | Honda ........................ 366/336 |
| 2010/0078086 A1 * | 4/2010 | Guidat et al. ............. 137/561 R |

FOREIGN PATENT DOCUMENTS

| EP | 1 036 588 A1 | 9/2000 |
| EP | 1 134 020 A1 | 9/2001 |
| WO | 02/096543 | 12/2002 |

* cited by examiner

*Primary Examiner* — Nathan Bowers
(74) *Attorney, Agent, or Firm* — Wenderoth, Lind & Ponack, L.L.P.

(57) ABSTRACT

A static continuous flow mixer, with or without reaction, is provided with basic cells, which are individually provided with an individualized chamber (1). The basic cells are also provided with at least two connecting channels (2), at least two of them being oblique relatively to the resulting direction (x) of the flow in the mixer, and with at least two additional apertures (0) for connection with the exterior. The cells interconnect successively in the space, forming a network. The mixer promotes convective processes. The dimensions ($D_j$, $l_i$, $d_i$, $\phi$), the geometry of the chambers (spherical or cylindrical) and of the channels (cylindrical or prismatic) may vary, as well as their quantity.

13 Claims, 3 Drawing Sheets

NETWORK MIXER AND RELATED MIXING PROCESS

TECHNICAL FIELD/APPLICATIONS

The present invention concerns a novel static mixer device for mixing fluids in a continuous mode, as well as the associated mixing process, with particular interest for the implementation of chemical reactions with conversion and selectivity control problems. Devices of this type may have several manufacturing applications in the chemical, biological and pharmaceutical industries. Examples include: polymerization reactions, for promoting a finer control of the molecular weight distributions; precipitation reactions, to obtain a finer manipulation on crystal sizes; in oxidation reactions, allowing the control of the reacting steps in order to achieve an effective control on the selectivity of the desired products; and in highly exothermic catalytic reactions, potentially explosive, permitting an effective and secure control of the reacting temperature during the reactive process.

STATE OF THE ART

The particular way in which different streams are mixed is, for a vast majority of industrial cases, the main factor for the efficient operation of the mixing devices, with special relevance for those processes where chemical reaction occurs. In industrial processes, the mixing efficiency and the control of the mixture quality can have multiple economical repercussions. These result either from the economy of reactants or from the environmental impact associated with the reduction of energy consumption. Extra advantageous features may be further explored, namely the improvement of the degree of control of the process, the increase of security of the operation and lower investments with equipment, all essential for an increase of the global income of the process (Hendershot, 2000; Keller and Bryan, 2000).

The understanding of mixing phenomena is complex and its current state of knowledge is still rather incomplete. In fact, the actual design of processing units involving mixing is mostly based on simplifying assumptions that the behaviour of these units either approaches the limit of perfect mixing or complete segregation. When mixing cannot be appropriately described by either of these limit cases, it becomes necessary to use much more elaborate heuristic mixing models, based on experimental data or on qualitative descriptions of behaviour of processing units (Levenspiel and Bischoff, 1972; Villermaux, 1993).

The mixing mechanisms in processing units are determined by hydrodynamics and geometric structure. Despite operational simplicity, most currently used mixers do not allow fast mixing and homogeneous mixtures at the microscopic level (Ehrfeld and Hessel, 2000; Schwalbe et al., 2002).

More recently, new complex mixing devices mostly based on non-moving regular structures are being introduced in industry, allowing for a better control of the mixing, carrying out a more rigorous design and the implementation of more versatile process strategies.

Different implementations have been treated in the literature, with significant advantages regarding the configurations traditionally used in the industry:

Monolithic structures, already implemented in large scale in industry, are now widely applied in the automobile combustion gas exhaustion device as the catalytic converter. Reactors of this type have also been proposed for other processing units with examples given by Cybulski and Moulijn (1998). However, monolithic structures cannot be used when an intimate mixing between the various reactants is desired. Dullien (2002) suggested the use of monolithic structures, in a modified configuration similar to a three-dimensional network where the fluid mixing would occur at channels' intersections, where the channel and the catalyst spatial distribution could be designed according to the required reactor objectives. However, the monolithic structures confer low conception flexibility, specifically when it is intended that the network of channels vary, namely in the flow's direction. On the other hand, with the mixture occurring in pseudo-chambers resulting solely from the channels' intersection, it is not possible to design autonomously the pseudo-chambers in relation to the corresponding channels. So, the chambers do not exist on their own, which is limiting.

A second rapidly growing implementation is the use of complex mixing structures consisting of the use of static flow barriers that promote mixing of the various streams. Examples of these commonly used static mixers include the "structured beds" by Sulzer Chemtech®. However, its application in large units involving chemical reaction has been rather limited, due to the high costs of equipment, difficulties in the operation's control and limited flexibility.

With a newly growing importance in process intensification and device size reduction, new miniaturized mixers have been proposed, namely microreactors and microfluidic systems (Ehrfeld et al., 1999; Ehrfeld and Hessel, 2000; Jensen, 1999 and 2001). However, despite the advances in the construction of these types of units, its manufacture is still complex, and with the associated high costs its use in many practical cases is still seriously limited. In particular, there is known, through patent EP1185359, a microreactor provided with one or more plates (20), each one of them with at least two cells (30), each one of these provided with a supplied chamber (33) for one of the fluids and with at least two regions (32) where there is carried out an independent multi-lamination, yet interlaid, of both fluids, so that these, once in the slots (37)—that are positioned above the zones (32)—mix themselves, benefiting of a substantially increased contact area by the preceding multi-lamination and intercalation of the admitted fluids. The mixture of the fluids within the slots (37) is conducted in laminar regime, solely by diffusion, contributing thereto the bigger contact area resulting from the previous passage by a provided plate (20). In a particular embodiment, corresponding to FIG. 2 of that patent, is described a device with two plates (20) disposed in series (considering the direction of the flow) for the mixture of a third fluid. However, the third fluid may only be introduced in the flow once the mixture of the two first fluids is completed. In fact, before the entry in the second plate (20), the flow resulting from the mixture of the two first fluids in the first plate (20) is previously gathered in the collecting chamber (39).

In light of the above, it is verified that interest exists in being able to have devices and/or processes that increase the efficiency and the control of the mixture, especially in cases where reaction occurs and, in particular, in the case where, besides mechanisms of mixture by diffusion, are also present mixture convective mechanisms. The same happens regarding devices and/or processes in which it is possible to ally the efficiency and the control of the mixtures/reactions with the possibility of adding more than two fluids with great flexibility, namely allowing the mixture of an additional fluid to the flow at any stage of the mixture/reaction of the flow already circulating, namely at a stage where the preceding mixture(s)/reaction(s) is(are) not completed.

DESCRIPTION OF THE INVENTION

The mixer according to the invention results from research and development work carried out at the School of Engineering of the University of Porto, between 1999 and 2004, in the scope of the research of the mechanisms of mixture in chemical reactors. This research has clearly demonstrated the potential for promoting strong convective mechanisms of mixing in regular network structures composed by regular associations of channels and individualized chambers.

It is therefore an object of the present invention to provide a mixing device, a network mixer, for promoting the control of mixing quality, and for the control of reaction conversion and selectivity. In the mixer according to the invention, those controls are promoted through particular realizations of mixing designs within the device interior and also through the inherent device versatility for implementing different feeding pre-mixing schemes. The final purpose is to promote the production of mixtures at the outlet of the mixer with desired characteristics by controlling the steps of the mixing, or mixture conversion and selectivity in the case of reacting fluids, along the device. It is a further object of the present invention to provide a mixing device where the particular structure of the mixer design will provide for an effective control of the evolution of the temperature by presenting the required specific area for heat transfer. In particular, it is intended not to limit the mixer and the process to the simple mixture/reaction by diffusion mechanisms, rather enabling and promoting the intervention of convective mixture mechanisms. It is also intended to have a great versatility in the injection/ejection that may be carried out in the several steps of the mixture/reaction that the flow sustains, even in situations where the mixture/reaction is still happening.

According to the invention, the above objectives are achieved by conceiving the mixer as a network of basic cells, each composed of: an individualized chamber; at least two channels connected with the aforementioned chamber, at least two of them oblique in relation to the resulting direction of the flow in the mixer; and at least two additional apertures connecting the interior of the chamber with the exterior of the particular cell, for connection with external channels. Finally, the network mixer is envisaged by sequentially interconnecting the basic cells in a two or three-dimensional space.

The present invention is a static mixer, with no movable parts, where chemical reaction may or may not occur.

The summation of the local mixing effects occurring along the interconnected cells forming a network results in that, as the fluids' mixture advances in the direction of the flow, mixing becomes very efficient, even without using movable parts.

Effectively, the fact that there are two channels presented obliquely in relation to the resulting direction of the flow in the mixer, enables the occurrence of convective mixture/reaction mechanisms that, thus, add to the diffusion mechanisms also present. In fact, in each of the outward streams of each cell there will be material of the various inlet streams. The mixture intensifies as the flow enters and leaves each successive line of cells. However, this is not the simple juxtaposition in series of the cells, as with the designed network disposition a mixed effect of distribution in series and in parallel is obtained. In particular, it is waived the reunion of all the flow in a general collecting chamber after a step of mixture/reaction and before moving on to the next step, reunion that is typical of the devices in which the cells are merely positioned in series. On the other hand, among the whole of the network cells, there are, at every instant, various particular sets of cells where the steps of mixture/reaction occurring are different, by opposition to the situation of cells positioned in a pure configuration in parallel, in which, at each moment, all the cells are in the same mixture/reaction step.

In a preferential embodiment of this invention, the chambers are individualized single spherical elements and the channels are cylindrical, numbering two or three in each basic cell; the same number of other apertures also exists in order to connect each chamber with external channels.

In an alternative preferential embodiment of this invention, the individualized chambers are cylinders with axis normal to the plane of the network mixer, and the channels, also numbering two or three, are rectangular prisms extending throughout the whole height of the cylindrical surface and extending in the mixer's plane, and the aforementioned apertures are maintained.

According to a particular embodiment of this invention, the successively interconnected basic cells present, all or only some of them, different linear and/or angular dimensions of their characteristic elements, conferring a large versatility to the mixer. In particular, the basic cells may be combined according to any of the preferred embodiments indicated above.

In another preferential embodiment of this invention, in each basic cell, the injection of the feeding streams is accomplished in the corresponding individualized chamber, through channels whose axis are coincident with those of the channels associated to that chamber, from which in turn occurs the ejection of the streams mixed within the particular chamber.

The injection and the ejection just referred to above, in reference to the basic cell, may or may not coincide with the injection to or the ejection from the network mixer in relation to its exterior. In fact, for example, if the ejection from the individualized chamber of a basic cell—by means of the corresponding associated channels—occurs exclusively within the mixing network towards other unit cells connected to the cell, then this does not constitute an ejection to the exterior, but rather the basis for the injection (within the network mixer) to the subsequent unit cells interconnected with that cell.

According to the invention, there may be other special configurations for specific basic cells and these cells will be referred as particular cells, by opposition to the above named basic cells.

In the particular cells the individualized chamber characteristic of the basic cells is always present. A particular cell may be conceived as resulting from a basic cell by suppressing one or more of the channels associated with the individualized chamber, by suppressing one or more of the apertures that provide the connection between the chamber and the cell's exterior, by addition of other apertures or other channels, or by the association of two or more of these possibilities.

Some configurations are also considered for particular cells where the injection channels are positioned in a special manner.

The particular cells are especially relevant for the boundary zones between the mixing device and the exterior, namely for cells corresponding to the first and last rows of the network, as well as those belonging to its columns of lateral cells. These cells are also especially useful for the injection or ejection (to and from the mixing unit, respectively) when these are located half way along the flow path of the network mixer.

It is furthermore an object of this invention to provide a mixing process of chemical species in a continuous flow manner, characterized in that two or more of the species are passed through a network mixer according to the invention.

The mixing mode of the different species may be diverse, namely by varying the injection and/or ejection points of the different species or their partial mixtures from the mixing device's exterior, eventually employing the aforementioned particular cells.

The efficient performance of this type of mixer and the associated process allows the reduction in the cost of separation of the non-reacted, secondary and desired products, with the resulting intensification of the processes where they are inserted (Stankiewicz and Mouljin, 2000). Important aspects, such as the development of new processes, analysis of new reactive or operation schemes, scale-up, and operational security may be taken into account in a fast and efficient way, with clear economical advantages.

A better understanding of the invention and process and any additional advantages and objects of the invention will become apparent to those skilled in the art upon reference to the detailed description and the accompanying drawings.

BRIEF DESCRIPTION OF THE DRAWINGS

The annexed figures, presented as mere non-limitative examples, illustrate the mixing unit upon reference, based on some of the embodiments referred to above, namely those corresponding to a planar (or two dimensional) network mixer. Thus.

DETAILED DESCRIPTION OF THE PREFERRED EMBODIMENT

A detailed description of the invention is presented based on the above figures where the various elements are:

0—apertures that connect the interior of the chamber with the exterior of the respective cell;

1—individualized chamber of each basic cell that constitutes the network mixer;

2—channels of each basic cell that promote the connection between cells and communicate with the interior of the basic cell chamber;

3—external injectors;

x—conventional main flow direction in the network mixer;

y—direction orthogonal to the main flow direction in the network mixer;

$\phi$—angle formed by the axis of a connecting channel of a basic cell and the x direction.

The present invention is a network mixer, with or without chemical reaction, for one or more feeding streams, with the intent of forming a new product.

The network mixer, according to present invention, presents different ways of operation, in order to reach the desired product.

In an embodiment, the network mixer is composed by a set of elements, chambers and channels of simple geometry: respectively spheres, characterized by the diameter D, and cylinders, characterized by the length $l_i$ and the diameter $d_i$.

Figure 1:
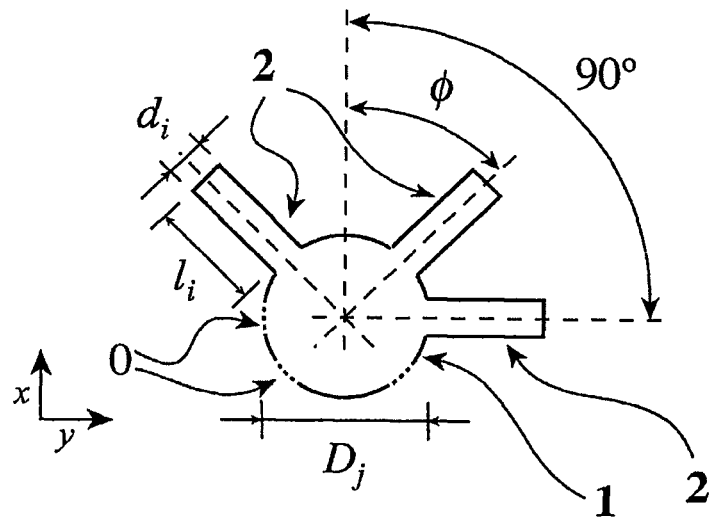
FIG. 1: Schematic representation of a basic cell of a network mixer, with: an individualized chamber, three channels connected to the chamber and three additional apertures for connecting the interior of the chamber to the cell's exterior.

The spheres and the cylinders are associated according to FIG. 1 in a basic cell formed by a chamber (1) and three channels (2) and three apertures (0), where one of the channels is placed transversally in relation to the main flow direction, and the other two channels form an angle, $\phi$, with the perpendicular to the transversal channel. All cylinders are positioned on the same plane as shown in FIG. 1.

Figure 2:
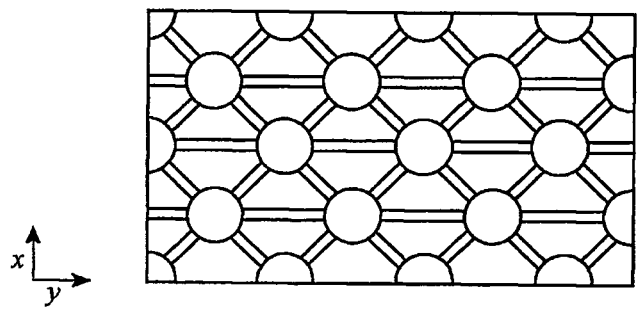
FIG. 2: Partial schematic representation of a network mixer generated by the interconnection of equal basic cells according to FIG. 1 in two directions.

The network mixer is generated by connecting a set of basic cells in two spatial directions, resulting in a planar geometry as shown in FIG. 2. Thus, six is the maximum number of cylinders that can be associated, in the same plane, to one sphere, as also shown in FIG. 2.

Figure 3:
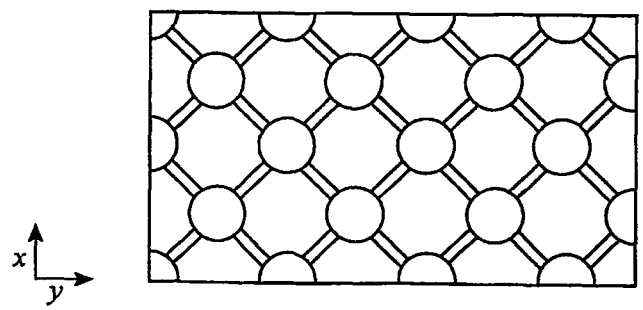
FIG. 3: Partial schematic representation of a network mixer generated by the interconnection, in a plane, of equal basic cells each with only two, rather than three channels.

The possibility of the use of different types of unit cells is also proposed, by varying the way the elements connect, namely the number of cylinders connected to each sphere or the angle $\theta$. An example with only two cylinders connected to the sphere is presented in FIG. 3.

Figure 4:
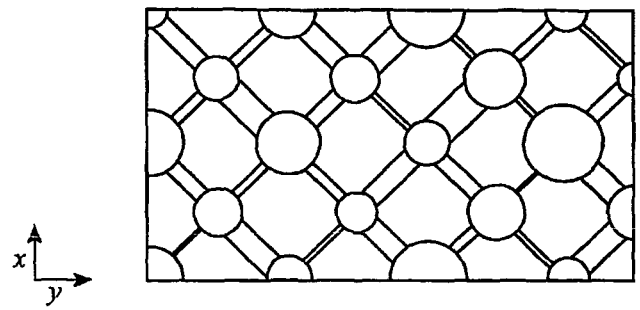
FIG. 4: Partial schematic representation of a network mixer generated by the interconnection, in a plane, of basic cells with two channels and with different sizes of its characteristic elements.

It is also proposed in this invention that any of the characteristic dimensions of the elements may have a non-uniform size, originating mixers with distributions of sizes of their characteristic elements. An example of this type of mixer is shown in FIG. 4.

Figure 5:
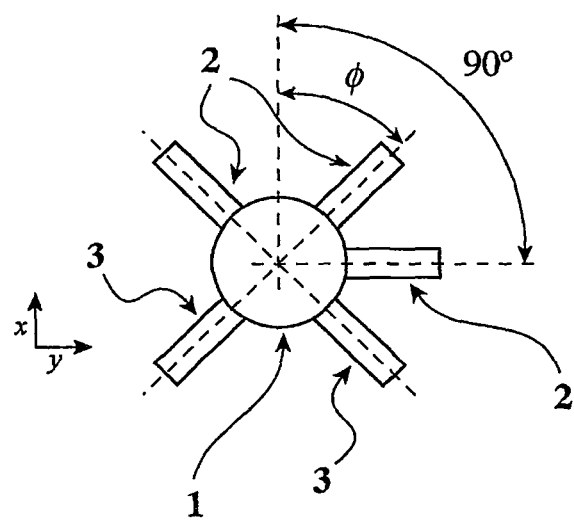
FIG. 5: Schematic representation of a particular cell of the network mixer, with: an individualized chamber, three channels connected to the chamber and two external injector channels connected to an equal number of chamber apertures.

Concerning the injectors (3) for feeding to the mixer, in a particular embodiment these are arranged on the same plane of the remaining associated cylinders (2), and in such a way that its centers are coincident with those of the mentioned remaining cylinders, as shown in FIG. 5.

Figure 6:
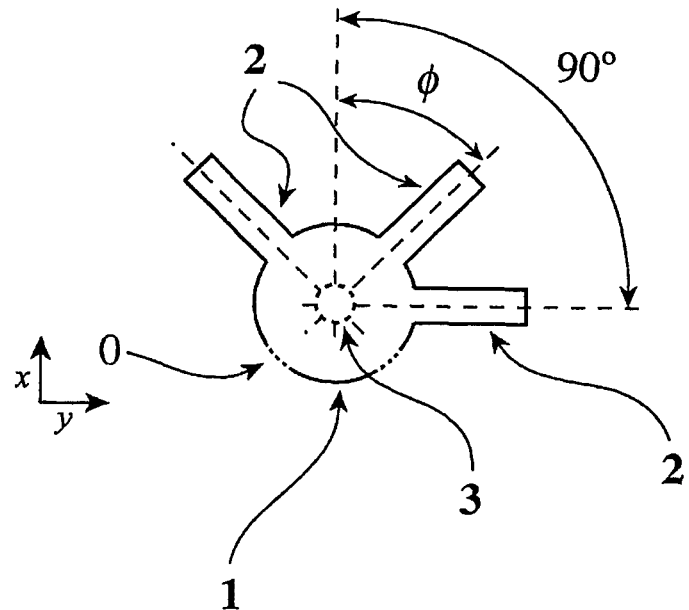
FIG. 6: Schematic representation of a particular cell of the network mixer, with: an individualized chamber, three channels connected to the chamber and two atypical external injector channels connected perpendicularly to the plane of the network mixer.

It is further proposed, for the case of the injectors, the possibility of different arrangements with the cylindrical elements, which are referred to as atypical injectors (3). An example is the use of diametrically opposed atypical injectors on a plane normal to the one of the cylinders associated to the sphere where the injectors (3) are placed, as shown in FIG. 6.

There is also proposed the possibility of association of injectors with atypical injectors, in the same sphere, in order to allow, for example, four injections of different streams simultaneously.

There is proposed the possibility of the network mixer to processing supplementary injectors along its structure, arranged or not in an organized way, aiming at the gradual addition of one or more reactants during the course of chemical reaction.

Concerning the outlets of the network mixer, these are arranged in the same plane of the remaining cylinders associated to the sphere where the outlets are placed, and in order to have their centers coincident with the ones of the remaining cylinders.

The possibility of using diametrically opposed atypical outlets is also proposed for the case of the outlets, and in a normal plane to the one of the cylinders associated to the sphere where the outlets are placed.

There is also proposed the possibility of the network mixer to including supplementary outlets along its structure, arranged or not in an organized way, aiming at the gradual extraction of products.

An alternative geometry is also proposed to the planar geometry of the network mixer, where the basic cells are arranged in a three-dimensional structure.

Figure 7:
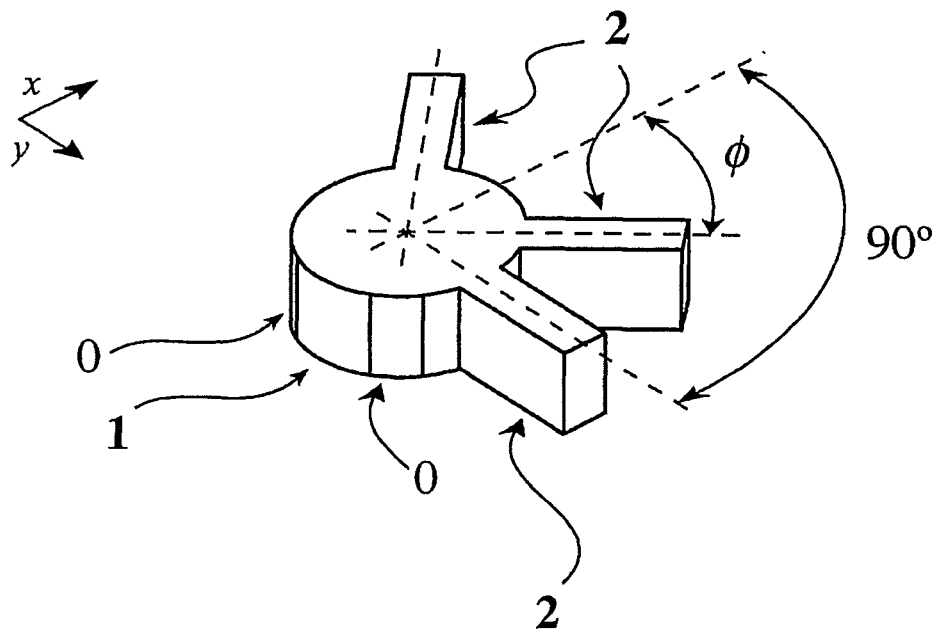
FIG. 7: Schematic representation of a basic cell of the network mixer, with: a single cylindrical chamber with axis normal to the plane of the mixing device and three prismatic channels with rectangular section extending throughout the whole height of the cylindrical surface of the chamber.

Prismatic rectangular channels and cylindrical chambers with a normal axis to the plane of the network mixer are also considered as an alternative geometry for the characteristic elements of the network mixer. The channels extend throughout the whole cylindrical surface of the cylindrical chambers, as shown in FIG. 7. In this last case, the apertures (0) and the outlets (2) also present a rectangular prismatic geometry, extending throughout the whole cylindrical surface of the cylindrical chambers (1). The previous considerations, either for geometry or for arrangement of the atypical and supplementary injectors, and also of atypical and supplementary outlets, are maintained.

INNOVATION AND ADVANTAGES OF THE INVENTION

The most significant advantages of the invention, in comparison with other mixers, are:

The structure of the network mixer is considerably simpler than other structures proposed and commercially available.

The network mixer does not contain any mobile elements.

The possibility of a strong and efficient mixing of liquid streams that, for the cases of reactions where the mixing is limited by diffusive mechanisms, becomes a paramount aspect for complex reactions in the liquid phase.

The opportunity of easy inclusion of temperature, pressure and/or concentration sensors, without modification of the network mixer hydrodynamic characteristics.

The dimensional character of the described network mixer results in a high specific area for heat exchange. This characteristic can be used for effective temperature control, as in highly endothermic or exothermic reactions, or when the selectivity depends strongly on the operating conditions.

Ease of implementation of different injection pre-mixing schemes for the inlet streams.

The network mixer can easily be constructed in different materials, with the intensification of heat transfer and catalysis processes through its walls.

The chemical reaction can be controlled through the definition of different types of catalysts in different zones of the unit or different units associated in series or parallel.

The geometric characteristics of the network mixer, in particular the ratios of the characteristic dimensions between the chambers and the channels, may be pre-designed in accordance with the specificity of the desired products.

Different network mixer units can be associated in parallel or in series. In this way, scale-up of a unit of this type is direct.

The mixing device can be easily linked to heat transfer units, in a similar arrangement as in a plate heat exchanger. The flow direction of fluids in the network mixer and in the heat transfer unit may easily be locally adjusted, in order to efficiently control the temperature in the interior of the mixer.

The selectivity and the conversion of the reaction can be controlled by the particular ways in which the chemical reactants are fed to the mixer and/or through the geometric characteristics of the mixing unit. The ability to control the mixing and the reactants residence time is a further advantage in relation to the currently used units.

Units of this type can be used in different types of processes, and some examples are presented below:

Oxidation reactions (Jensen, 2001). In this type of reaction the selectivity of the desired products, resulting from the intermediate reaction, is highly dependent on the concentration of the available oxygen. Security problems become important due to the likelihood of explosion (Jähnisch et al., 2000). The possibility of controlling the feed and the reactants mixture in these reacting units, as well as the reaction's temperature, is a key issue to obtaining good selectivity for the desired products.

Synthesis of dangerous products. The network mixer can be constructed using materials adequate to the reactants and products involved. Examples include the synthesis of isocyanides (Ehrfeld et al., 2002), phosgene (Ajmera et al., 2001), and sylanes (Ehrfeld et al., 2002). The possibility of using various network mixer units in parallel is advantageous for dangerous reactions and in the case of accidents, since it avoids process stoppage for maintenance.

Synthesis of chemical products involving a large number of steps. Since different network mixer units can be connected in series, the various reaction steps can be carried out continuously. On the other hand, the possibility of controlling the reactants residence time and distribution to obtain high conversion and selectivity makes these units particularly interesting for the pharmaceutical industry (Jensen, 2000).

Mixing high viscosity materials, such as paints. In this case mixing is controlled by diffusion mass transport mechanisms and it is often difficult to ensure the quality of the final product.

Synthesis of products where mixing effects are critical, such as pigments based on azoic compounds. The possibility of controlling the reactants feed, the distribution of catalysts and the reaction temperature, increases the likelihood of obtaining the desired products and increases the process efficiency (Nickel et al., 2001; Wille et al., 2002).

REFERENCES

Ajmera, S., Losey, M. W., Jensen, K. F., Schmidt, M. A., "Microfabricated Packed-Bed Reactor for Phosgene Synthesis", *AIChE J.*, 47(7), 1639-1647, 2001.

Cybulski, A., Moulijn, J. A. Structured Catalysts and Reactors, Marcel Dekker, Inc., 1998.

Dullien, F. A. L, "Catalyst Support with Intersecting Channel Network, Catalysis Reactor Comprising Same and Method for Making Same", World Patent WO02/081083 A1, 2002.

Ehrfeld, W., Golbig, K., Hessel, V., Löwe, H., Ritrcher, T., "Charcaterization of Mixing in Micromixers by a Test Reaction: Single Mixing Units and Mixer Arrays, IEC&R, 38(3), 1075-1082, 1999.

Ehrfeld, W., Hessel, V., "3-Micromixers", *Microreactors: New Technology for Modern Chemistry*, Wiley-VCH, 2000.

Ehrfeld, W., Hessel, V., Haverkamp, V., "Microreactors", Ullman Encyclopedia of Industrial Chemistry, Wiley-VCH, 2002.

Hendershot, D. C., "Process Minimization: Making Plants Safer", *Chemical Engineering Progress*, January 2000, 35-40.

Jähnisch, K., Baerns, M., Hessel, V., Ehrfeld, W., Haverkamp, V., Löwe, H., Wille, Ch., Guber, A., "Direct Fluorination of Toluene Using Elemental Fluorine in Gas/Liquid Microreactors", *J. Fluorine Chemistry,* 105, 117-128, 2000.

Jensen, K. F., "Microchemical Systems: Status, Challenges and Opportunities", *AIChE J.,* 45(10), 2051-2054, 1999.

Jensen, K. F., "The Impact of MEMS on the Chemical and Pharmaceutical Industries", *Solid-State Sensor and Actuator Workshop,* Jun. 4-8, 2000.

Jensen, K. F., "Microreaction Engineering—Is Small Better?", *Chemical Engineering Science,* 56, 293-303, 2001.

Keller, G. E., Bryan, P. F., "Process Engineering: Moving in New Directions", *Chemical Engineering Progress,* January 2000, 41-50.

Levenspiel, O., Bischoff, K. B., "Patterns of Flow in Chemical Process Vessels", *Adv. Chem. Engng.,* 7, 95-198, 1972.

Nickel, U., Jung, R., Saitmacher, K., Unverdorben, L., "Preparation of Azo Colorants in Microreactors", US Patent 2001/0029294/A1, 2001.

Schwalbe, T., Aurte, V., Wille, G., "Chemical Systhesis in Microreactors", *Chimia,* 56(11), 636-646, 2002.

Stankiewicz, A. I., Moulijn, J. A., "Process Intensification: Transforming Chemical Engineering", *Chemical Engineering Progress,* January 2000, 22-34.

Villermaux, J, "Génie de Reaction Chimique", Lavoisier, 1993.

Wille, Ch., Autze, V., Kim, H., Nickel, U., Oberbeck, S., Schwalbe, Th., Unverdorben, L., "Progress in Transferring Microreactors from Lab into Production—an Example in the Field of Pigments Technology", IMRET 6, 2002.

The invention claimed is:

1. A static mixer that includes:
a set of basic cells forming a mixer, said basic cells being sequentially interconnected in a two or three dimensional arrangement so as to have a direction of flow within the mixer;
wherein each basic cell of a plurality of said basic cells is composed of a single individualized chamber, each said single individualized chamber having:
at least two apertures that connect an interior space of said single individualized chamber with the exterior of said basic cell, and
at least two connecting channels extending a distance from said single individualized chamber, with at least two of said at least two connecting channels extending from said single individualized chamber in a direction oblique relative to said direction of flow within the mixer.

2. The static mixer of claim 1, wherein said plurality of basic cells includes basics cells that vary between each other in dimensions of at least one of (a) an angle at which said at least two connecting channels extend from said single individualized chamber, (b) a length of said at least two connecting channels that extend from said single individualized chamber, and (c) the size of said single individualized chamber.

3. The static mixer of claim 1, wherein each basic cell of said plurality of said basic cells is composed of said single individualized chamber as a spherical chamber, said at least two channels comprising two or three cylindrical channels and said at least two apertures comprising two or three apertures that connect to external channels.

4. The static mixer of claim 1, wherein each basic cell of said plurality of said basic cells is composed of said single individualized chamber as a cylindrical chamber that has a cylindrical surface and an axis normal to a plane of the mixer, said at least two channels comprising two or three rectangular prismatic channels that extend along the entire height of the cylindrical surface of said cylindrical chamber in a direction normal to the plane of the mixer, and said at least two apertures comprising two or three apertures in said cylindrical surface of said cylindrical chamber that connect to external channels.

5. The static mixer of claim 1, wherein each basic cell of said plurality of said basic cells has said single individualized chamber thereof connected to channels of other basic cells by said at least two apertures such that axes of said channels of other basic cells are coincident with axes of said at least two channels of said basic cell having said individualized chamber.

6. The static mixer of claim 1, and further comprising cells having cylindrical channels which have an axis that is normal to an xy plane and that extends through a center of a single individualized chamber, said cylindrical channels allowing injection to respective single individualized chambers in addition to injection received through apertures thereof or, alternatively, allowing ejection of a mixture stream from the respective single individualized chambers in addition to ejection through channels thereof, wherein the xy plane is defined by the direction of flow within the mixer and a direction defined by centers of two said single individualized chambers that are directly interconnected with each other by a channel.

7. The static mixer of claim 1, wherein said plurality of basic cells include:
first basic cells in which said single individualized chamber is spherical, said at least two channels comprise two or three channels and said at least two apertures comprise two or three apertures that are connected to external channels; and
second basic cells in which said single individualized chamber is a cylindrical chamber, having a cylindrical surface and an axis normal to a plane of the mixer, said at least two channels comprise two or three rectangular prismatic channels that extend along the entire height of the cylindrical surface of said cylindrical chamber in a direction normal to the plane of the mixer, and said at least two apertures comprise two or three apertures in the cylindrical surface that are connected to external channels.

8. Mixing process for chemical species in a continuous flow, characterized in that two or more of these species pass through the network mixer according to claim 1, where the injection from the mixer's exterior is either done simultaneously for all species from the start of the mixer, or only for the two first species, the other species being progressively injected from the exterior in predetermined mixing points of the mixer, and where the ejection to the mixer's exterior is done either at the end of the mixer, in relation to the resulting mixture, or simultaneously in predetermined mixing points of the mixer, relatively to intermediate mixtures.

9. Process according to claim 8 characterized in that the eventual intermediate injections and ejections take place in the mixer in cells in which the feed streams injection to the respective individualized chamber (1) is accomplished by channels whose axis are coincident with the axis of the channels associated with the respective chamber through which channels is promoted the ejection of the resulting mixture streams and initial injections or final ejections take place in cells in which the feed streams injection to the respective individualized chamber (1) is accomplished by channels whose axis are coincident with the axis of the channels associated with the respective chamber through which channels is promoted the ejection of the resulting mixture streams.

10. A static mixer that includes:
a set of basic cells forming a mixer, said basic cells being sequentially interconnected in a two or three dimensional arrangement so as to have a direction of flow within the mixer;
wherein each basic cell of a plurality of said basic cells is composed of a single individualized chamber, each said single individualized chamber having:
- at least two apertures that connect an interior space of said single individualized chamber with the exterior of said basic cell, and
- at least two connecting channels extending a distance from said single individualized chamber, with at least two of said at least two connecting channels extending from said single individualized chamber in a direction oblique relative to said direction of flow within the mixer; and wherein said plurality of said basic cells are arranged such that said single individualized chambers thereof are spaced and separated from each other by said connecting channels and each of said connecting channels connects only two different single individualized cells.

11. The static mixer of claim 10, wherein said plurality of basic cells includes basics cells that vary between each other in dimensions of at least one of (a) an angle at which said at least two connecting channels extend from said single individualized chamber, (b) a length of said at least two connecting channels that extend from said single individualized chamber, and (c) the size of said single individualized chamber.

12. The static mixer of claim 10, wherein each basic cell of said plurality of said basic cells has said single individualized chamber thereof connected to channels of other basic cells by said at least two apertures such that axes of said channels of other basic cells are coincident with axes of said at least two channels of said basic cell having said individualized chamber.

13. The static mixer of claim 10, wherein said plurality of basic cells include:
- first basic cells in which said single individualized chamber is spherical, said at least two channels comprise two or three channels and said at least two apertures comprise two or three apertures that are connected to external channels; and
- second basic cells in which said single individualized chamber is a cylindrical chamber, having a cylindrical surface and an axis normal to a plane of the mixer, said at least two channels comprise two or three rectangular prismatic channels that extend along the entire height of the cylindrical surface of said cylindrical chamber in a direction normal to the plane of the mixer, and said at least two apertures comprise two or three apertures in the cylindrical surface that are connected to external channels.

* * * * *